May 3, 1938.                K. HENRICHSEN                2,116,395
                         RETRACTILE LANDING GEAR
                          Filed April 25, 1936           5 Sheets-Sheet 1
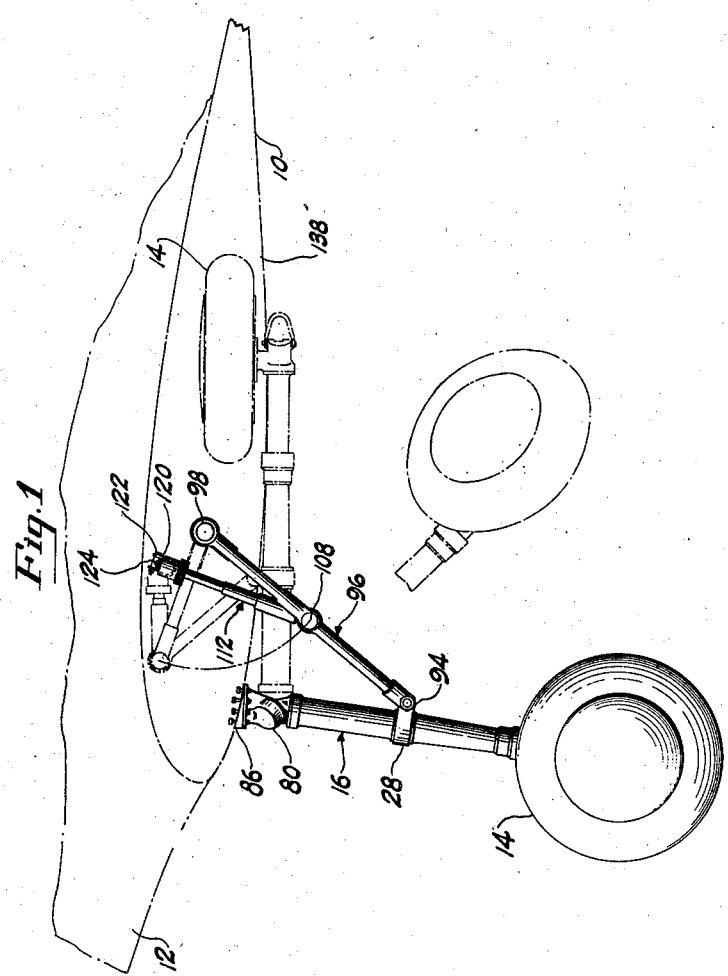
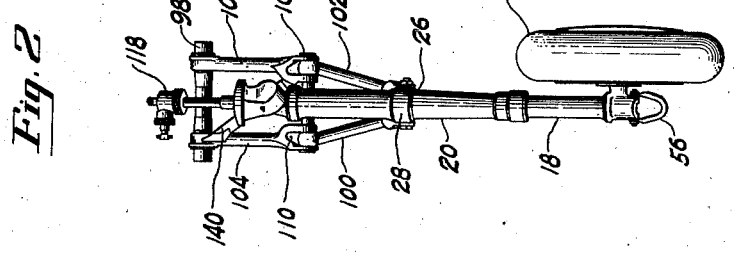
INVENTOR.
Knut Henrichsen
BY
ATTORNEY

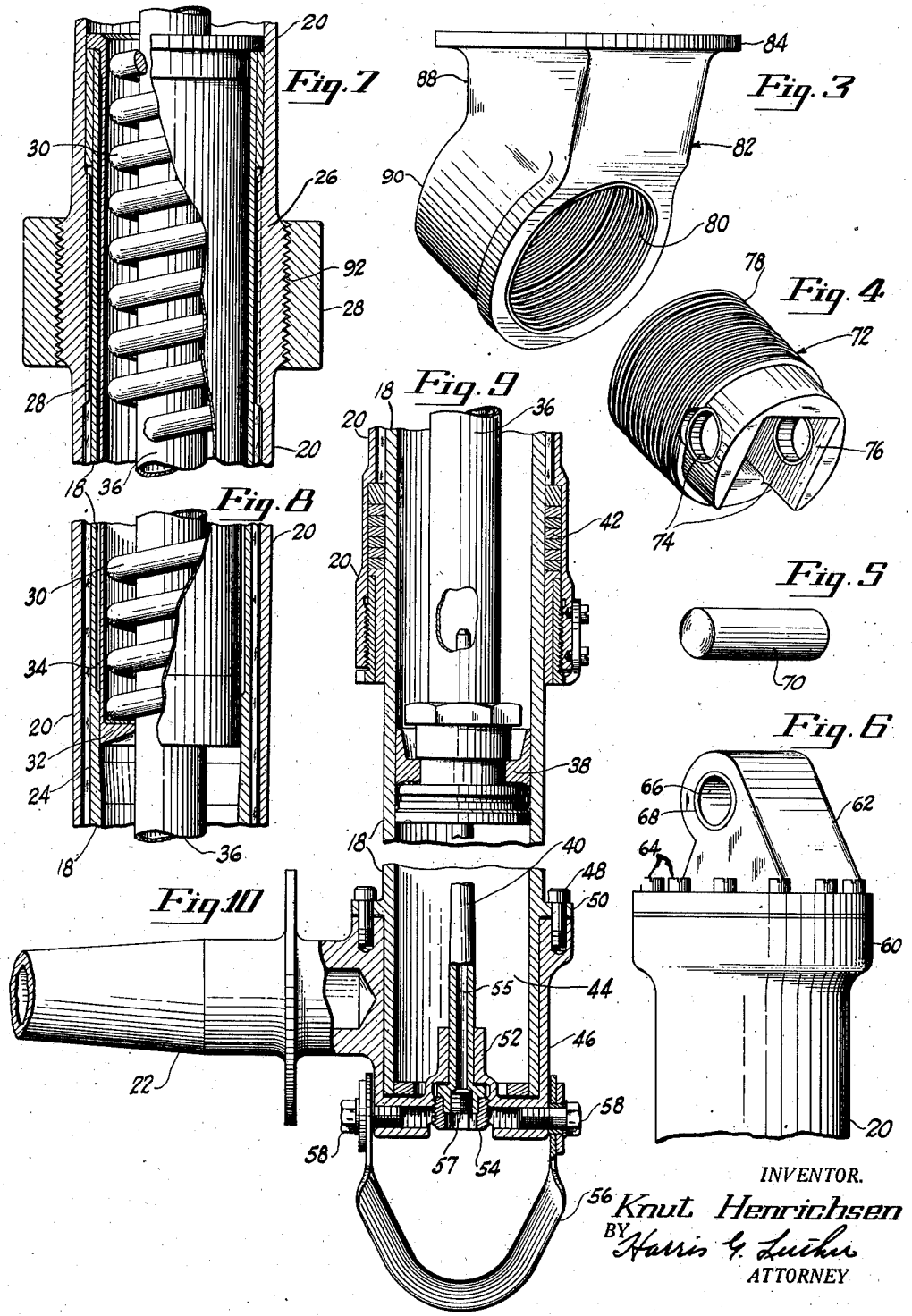

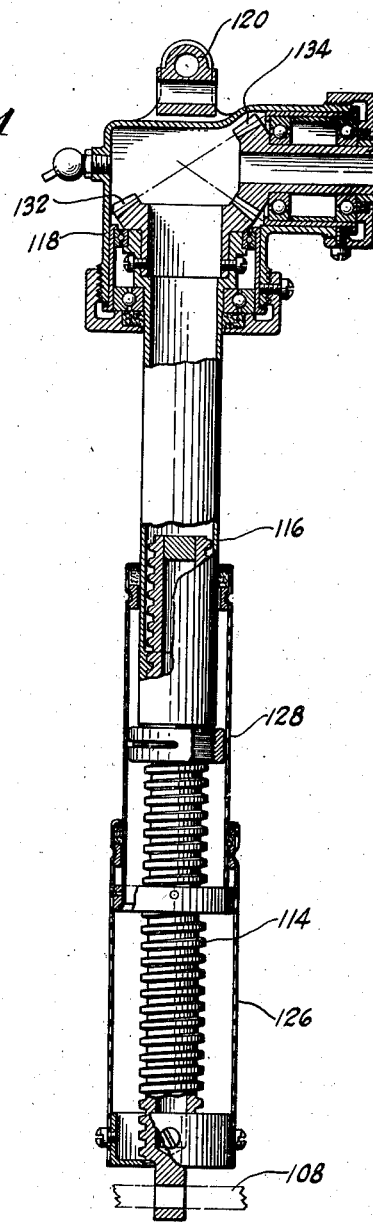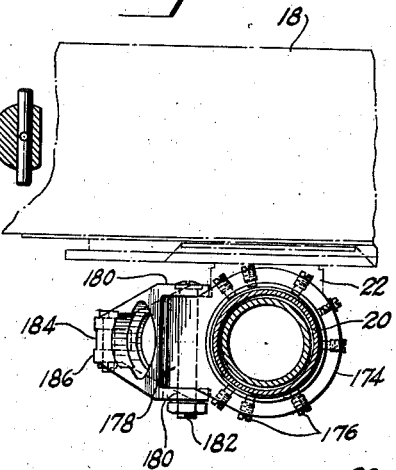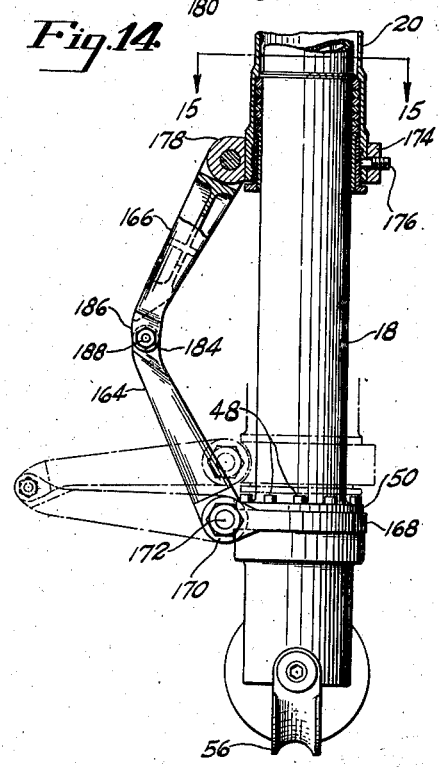

May 3, 1938. K. HENRICHSEN 2,116,395
RETRACTILE LANDING GEAR
Filed April 25, 1936 5 Sheets-Sheet 4
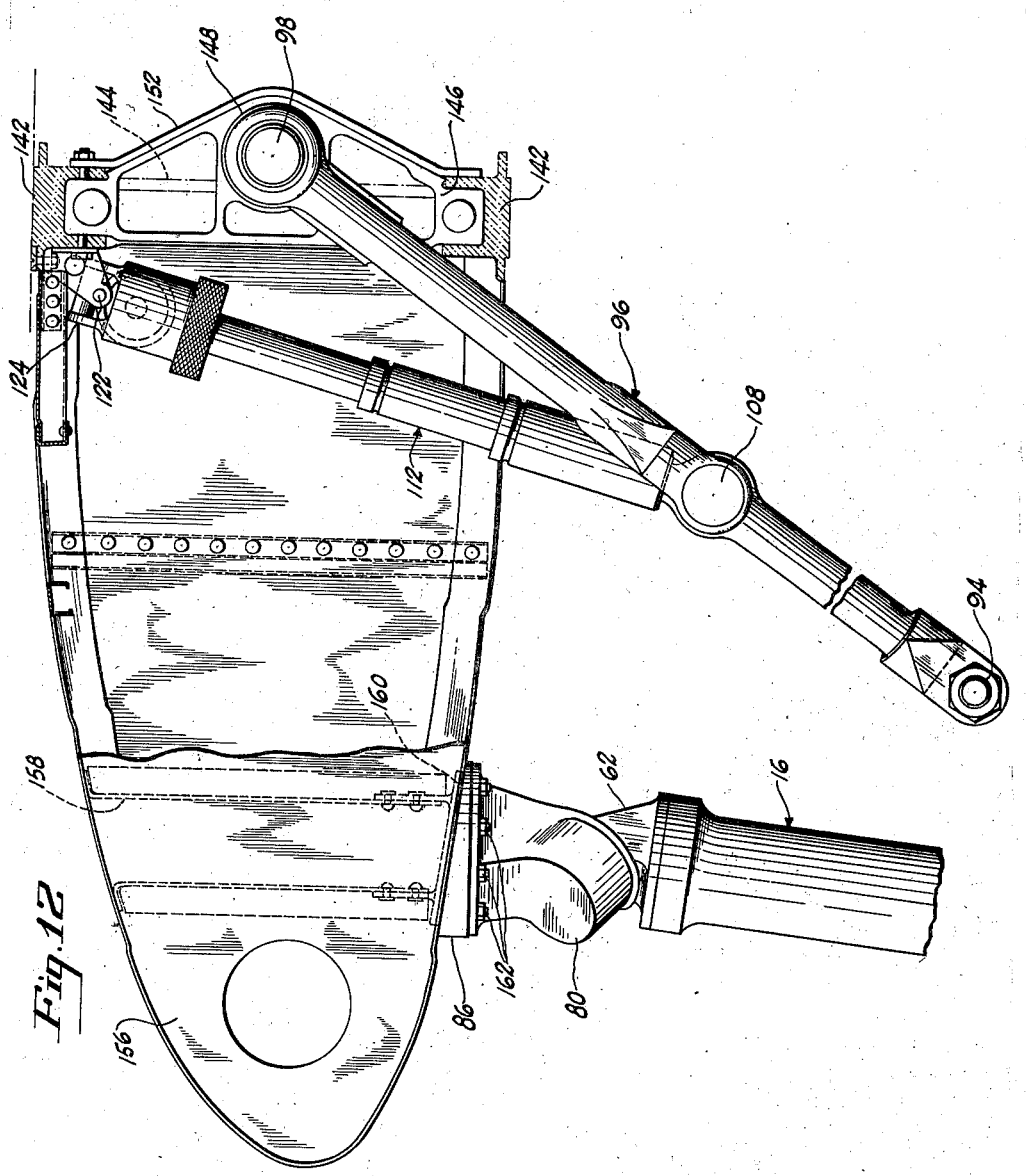
INVENTOR:
Knut Henrichsen
BY Harris G. Luther
ATTORNEY

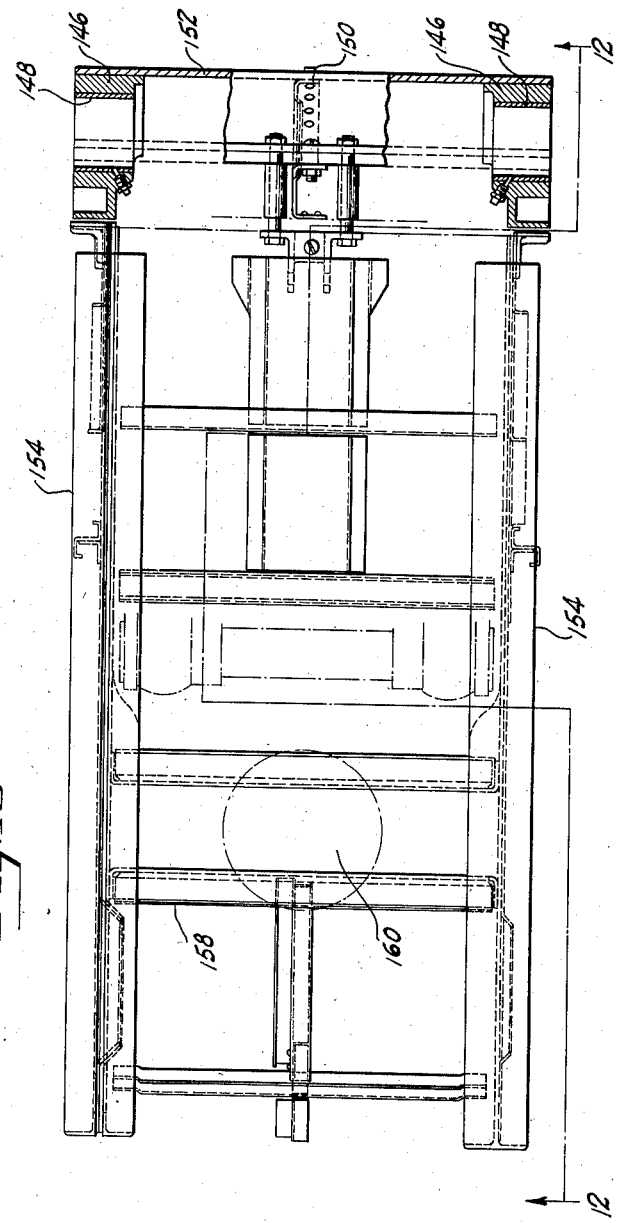

Patented May 3, 1938

2,116,395

UNITED STATES PATENT OFFICE 2,116,395

RETRACTILE LANDING GEAR

Knut Henrichsen, Stratford, Conn., assignor to United Aircraft Corporation, East Hartford, Conn., a corporation of Delaware Application April 25, 1936, Serial No. 76,460

10 Claims. (Cl. 244—102)

This invention relates to improvements in retractile landing gears and has particular reference to a landing gear in which the wheel or a portion thereof is folded into an opening provided in a portion of the airplane upon which the landing gear is mounted when the landing gear is retracted.

An object of the invention resides in the provision of a retractile landing gear wherein the axis of the wheel is rotated as the landing gear is retracted to bring the wheel into position to fit into an opening provided in the airplane structure carrying the landing gear.

A further object resides in the provision of means for projecting and retracting the landing gear and for releasably locking the landing gear in either its projected or retracted position and for simultaneously rotating the axis of the landing gear wheel while the landing gear is being retracted.

A still further object resides in the provision of a strong and rigid mounting for a retractable landing gear upon the underside of an airplane.

Another object resides in the provision of a retractile landing gear which is light in weight and at the same time so sturdily constructed that it will not ordinarily get out of order in use and which is simple and easy to operate.

Other objects and advantages will be more particularly pointed out hereinafter, or will become apparent as the description proceeds.

In the accompanying drawings in which like reference numerals are used to designate similar parts throughout, there is illustrated a suitable mechanical embodiment of what is now considered to be the preferred form of the invention and a somewhat modified form thereof. The drawings, however, are for the purpose of illustration only and are not to be taken as limiting the invention, the scope of which is to be measured entirely by the scope of the appended claims.

In the drawings Fig. 1 is a side elevational view of a landing gear constructed according to the idea of this invention, the portions of the airplane to which the landing gear is attached being schematically illustrated.

Fig. 2 is a front elevational view of the landing gear construction illustrated in Fig. 1.

Fig. 3 is a perspective view on an enlarged scale of the outer swivel bearing member for the upper end of the landing gear strut.

Fig. 4 is a perspective view of the inner swivel bearing member for the upper end of the landing gear strut.

Fig. 5 is a perspective view of a pin which connects the upper end of the landing gear strut to the inner swivel bearing member illustrated in Fig. 4.

Fig. 6 is a perspective view of the upper end of the landing gear strut.

Fig. 7 is a vertical sectional view of the portion of the landing gear strut to which the landing gear braces are connected.

Fig. 8 is a vertical sectional view of a portion of the landing gear strut intermediate its length.

Fig. 9 is a vertical sectional view of a portion of the landing gear strut adjacent to its lower end.

Fig. 10 is a vertical sectional view of the lower end or wheel carrying portion of the landing gear strut.

Fig. 11 is a longitudinal sectional view through the screw retracting mechanism.

Fig. 12 is a sectional view of a portion of an airplane wing showing the manner of attaching a landing gear constructed according to the idea of this invention to the airplane wing.

Fig. 13 is a plan view of the landing gear support illustrated in Fig. 12.

Fig. 14 is a side elevational view of the lower portion of a modified form of landing gear strut and, Fig. 15 is a sectional view on the line 15—15 of Fig. 14.

Referring to the drawings in detail, the numeral 10 indicates the wing of an airplane which may be of the low wing or center wing type in which the fuselage 12 is mounted upon or in the plane of the wing. When upon the ground the airplane, comprising the wing 10 and fuselage 12 and other conventional parts, is supported upon a pair of landing wheels, one of which is indicated at 14 by means of respective landing gear struts, one of which is generally indicated at 16. As the two landing gear struts are exactly similar in all respects with the exception that one is adapted for use upon the right hand side of the airplane and the other is adapted for use upon the left hand side thereof, it is believed that a detail description of only one of the two similar strut constructions is sufficient for the purpose of this disclosure.

The strut 16 is of a telescopic oleo type having two telescopically associated relatively slidable portions 18 and 20. The smaller member 18 projects from the lower end of the larger member 20 and is provided at its lower end with a wheel carrying spindle 22 upon which the landing wheel 14 is rotatably mounted. While the two members 18 and 20 are axially slidable relative to each other, in the form of the invention illustrated in Figs. 7 and 8, they are restrained against relative rotational movement by a plurality of longitudinally disposed interengaging splines 24, particularly illustrated in Fig. 8. The splines 24 are disposed intermediate the length of the two members, the splines on the interior of the outer member 20 being located adjacent to the enlarged screw threaded portion 26 upon which the brace attaching collar 28 is rotatably mounted. The splines on the exterior surface of the inner member 18 are longer than the splines on the interior surface of the outer member 20 to provide for the relative telescopic movements between these two members. The member 18 is resiliently maintained in its extended position with respect to the member 20 by means of a coiled compression spring 30 located within the inner member and bearing at its upper end against the upper end closure of the outer portion 20 of the strut and at its lower end against an inturned flange 32 provided at the lower end of a sleeve member 34 secured within the lower portion of the inner member 18. The action of the compression spring 30 is controlled by a hydraulic shock absorber which comprises a tubular member 36 positioned within the inner member 18 concentric therewith and attached at its upper end to the upper end closure of the outer member 20, a piston generally indicated at 38 upon the lower end of the tubular member 36 and a tapered finger valve 40 operating through the piston 38 in the lower portion of the tubular member 36. A hydraulic seal 42 is provided between the interior of the lower end of the member 20 and the member 18. The hydraulic fluid is ordinarily retained in a chamber 44 in the lower portion of the inner member 18, but when the landing wheel is subjected to the impact load of the landing airplane or strikes an obstruction which lifts the wheel and drives the inner member up into the outer member, a portion of this hydraulic fluid flows through the aperture between the tapered finger valve 40 and the opening in the piston 38 through which the finger valve projects and into the interior of the tubular member 36. When the spring 30 forces the inner member 18 outwardly with respect to the outer member 20, the fluid flows from the interior of the tubular member 36 back into the chamber 44.

The spindle 22 is formed at its end opposite the wheel carrying portion with a cup-shaped bearing 46 which receives the lower end of the strut member 18. Bolts 48 passing through a radially extending flange 50 of the lower portion of the member 18 and screw threaded into the upper end of the bearing member 46 rigidly secure the spindle upon the strut. In its lower end the cup-shaped member 46 is provided with a seat 52 for the lower end of the finger valve 40 and with an aperture closed by a screw threaded plug 54 through which the finger valve may be inserted or removed from its operative associate in the landing gear strut.

The tapered finger valve is provided with an axial bore 55, the lower end of which is normally closed by a removable plug 57. Hydraulic fluid may be added to the strut by removing the plug 57 and connecting a fluid conduit with the lower end of the finger valve and forcing the fluid through the conduit and up through the bore 55. When the conduit is detached any excess fluid will flow out through the hollow finger valve until the level of the fluid in the reservoir 44 is even with the top of the finger valve, so that the finger valve affords a simple and effective means for definitely maintaining the proper amount of hydraulic fluid in the strut.

A towing link 56 is secured in pivotal relation to the bottom of the cup-shaped bearing 46 by means of the bolts 58 screw threaded into the lower portion of the bearing.

At its upper end the outer member 20 is provided with an outwardly extending flange 60 upon which is mounted the upper cover member 62 secured to the flange by suitable means such as the cap screws 64. The upper cover member 62 has an upward extension through which extends a pin receiving aperture 66 lined with a suitable bushing 68, the portion of the cover member adjacent the aperture being rounded to form a loop or ear around the aperture. This upper end of the outer strut member 20 is connected by means of its apertured cover member 62 and the transverse pin 70 with an inner swivel bearing member generally indicated at 72, the pin 70 extending through the aperture 66 and bearing at its ends in apertures 74 provided in a hollow extension 76 on the inner bearing member which extension receives the loop portion of the cover member 62 surrounding the aperture 66. It will be observed that this pin connection provides a hinged joint between the strut and the inner bearing member 72. The bearing member 72 is provided with exterior screw threads as indicated at 78 which mesh with similar screw threads 80 provided in the interior of the socket portion of an outer swivel bearing member generally indicated at 82. The member 82 is provided with a flat apertured flange 84 by means of which the member may be attached to the underside of the wing 10, a tapered washer 86 being interposed between the flange 84 and the undersurface of the wing to accommodate the outer bearing member to the contour of the wing surface.

In addition to the flange 84 and a stem portion 88, the bearing member 82 is provided with a hollow socket portion 90 which rotatably receives the inner swivel bearing member 72. The socket portion 90, as clearly illustrated in Figs. 1 and 3, is disposed at an angle of 45 degrees in both the X and Z planes to the perpendicular axis of the flange 84 considered as the Y ordinate. Referring to Fig. 1 it will be observed that the longitudinal axis of the socket 90 is so directed that the open end of the socket faces inwardly, downwardly and rearwardly with respect to the wing 10. The corresponding screw threads 78 and 80 provide a bearing surface between the socket and the inner bearing member 72 so that the inner member may rotate freely in the socket and will at the same time be restrained against load induced axial movement with respect to the socket.

The collar 28 rotatably mounted upon the screw threaded thickened portion 26 of the outer strut member 16 is provided with internal screw threads 92 which cooperate with the screw threads on the strut member to provide a rotatable bearing between the strut member and the collar. This collar 28 is provided with a pair of spaced apertured, rearwardly directed ears, or lugs, indicated at 94 and to these lugs there is pivotally connected one end of a brace member generally indicated at 96, the other end of which is pivotally connected by means of a pin 98 to the interior structure of the wing which will be presently described. The brace member 96 comprises four link members as clearly illustrated in Figs. 1 and 2. The lower link members 100 and 102 are pivotally connected to the upper link members 104 and 106 by means of a bearing pin 108 to provide an elbow joint in the brace member, the members 100 and 102 being provided with stops as indicated at 110 to limit the relative movement between the respective links so that the pin 108 can move along the arc illustrated in Fig. 1 from a position in which the brace member is straight as illustrated in full lines, to the position illustrated in broken lines, but cannot move in the opposite direction past the position at which the brace member is straight. With this elbow type of joint, when the brace member 96 is straight it forms a rigid strut member between the connections 94 and 98, and when the brace member is bent as illustrated in broken lines in Fig. 1 it serves to swing the strut 16 rearwardly to move the landing gear from the landing or projected position illustrated in full lines in Fig. 1 to the retracted position illustrated in broken lines in which the wheel is positioned within the contour of the wing.

Owing to the angular relation of the axis of the bearing between the member 72 and the socket 90, the strut is rotated about its own axis as it is swung from its retracted to its extended position, or vice versa, but when the strut is in its extended position it is positively held against rotation by the angular relation between the socket and the strut carrying bearing member and no additional locking device is necessary to restrain the strut against rotation about its own axis.

The landing gear is moved from its projected to its retracted position and vice versa by means of a screw member generally indicated at 112 and particularly illustrated in Fig. 11. This screw member comprises an externally screw threaded shaft 114 pivotally connected at its lower end to the pin 108 between the ends of the links 104 and 106 and an internally screw threaded tubular member 116 screw threaded upon the member 114 and bearing at its upper end in a bracket 118 pivotally secured by means of the integral lugs 120 and pins 122 and 124 to the upper portion of the wing truss. The screw members 114 and 116 are covered by a pair of telescopically associated tubular members 126 and 128. At its upper end and within the casing 118 the screw member 116 is provided with a bevel gear 132 which meshes with a beveled gear 134 mounted upon the end of a torque shaft 136 which leads to an operator controlled mechanism by means of which the shaft 136 may be rotated to project or retract the landing gear.

The operation of the retracting mechanism described above is substantially as follows: Assuming the landing gear wheels to be down as illustrated in full lines in Fig. 1 and that it is desired to retract the same so that the wheels will lie in the circular openings or pockets 138 provided for them in the undersurface of the wing 10, the shaft 136 will be rotated in a direction to cause the screw member 114 to screw into the screw member 116, thus shortening the distance between the two ends of the retracting screw 112. As the upper end of the retracting screw 112 is pivotally connected to the wing truss at a point positioned above and forwardly of the positions of the pivotal connection between the brace member 96 and the wing truss, the elbow joint of the brace member 96 will be broken and the pin 108 will be drawn upwardly and forwardly into the wing. This movement of the pin 108 will move the connection 94 rearwardly along an arc centered on the axis of the pin 70. This action rotates the inner swivel bearing members 72 in the skewed socket 90 of the outer bearing member 82, thereby causing the axis of the wheel 14 to rotate as the strut 16 is swung rearwardly to change the plane of rotation of the wheel from a position transverse to the wing as illustrated in full lines in Fig. 1 to a position parallel to the undersurface of the wing as illustrated in broken lines at the limiting position of the wheel in Fig. 1, or in other words rotating the plane of the wheel through approximately 90° when the strut is swung approximately 90° to the rear. It is believed that this movement is clearly shown from an inspection of Fig. 1, in which it will be seen that as the strut 16 is swung about the axis of the skewed socket 90 the wheel will travel in an arc tangent to the planes of the wheel in its two limiting positions. It is desired, however, to have the wheel swing straight back from its projected to its retracted position instead of swinging out radially in a direction prescribed by an arc centered on the axis of the socket 90. In order to accomplish this purpose the pin joint comprising the loop 62, the extension 76 and the pin 70, is provided between the upper end of the strut and the inner member 72 of the swivel bearing and the brace member 96 is made in two laterally spaced parts to support the strut member 16 against loads lateral to the wheel. With this construction as the member 72 rotates in the socket 90, the strut 16 also swings relative to the end of the member 72 so that the wheel moves straight back along an arc in a plane perpendicular to the wing and the strut 16 rotates in the collar 28 as the wheel is moved rearwardly. The two brace members 104 and 106 may be provided with a diagonal brace member 140 to assist them in taking lateral loads imposed on the wheel and the supporting structure 16.

While it is obvious that the improved landing gear described above may be attached either to the wing or to the fuselage or hull of an airplane or flying boat without in any way exceeding the scope of the invention, there has been shown for purposes of illustration, an installation in which the improved retractile landing gear is attached to the airplane wing adjacent to the fuselage upon each side thereof. In installations in which the landing gear is attached to the wing it has been found necessary to provide within the wing a strong and rigid truss construction sufficient to carry the heavy loads between the landing gear and the airplane. A suitable wing truss construction is particularly illustrated in Figs. 12 and 13 of the drawings.

In this construction the wing spar or beam 142 comprises an upper and lower member of channel cross section having their flanges interconnected by suitable web members, one of which is indicated in dotted lines at 144. At the point to which the upper end of the brace member 96 is connected to the spar, the web members 144 are cut away and there is substituted for the web members a pair of rigid brackets 146 disposed between the upper and lower members of the spar. These brackets 146 are each provided with a bearing aperture 148 and are spaced apart so that the bearing openings 148 in the respective brackets 146 receive the ends of the pin 98. Upon each side of the above described bearing construction, the spar is reinforced by transverse members as indicated at 150 and the whole construction is further strengthened by means of a relatively heavy piece of sheet metal 152 attached to the rear surface of the brackets and transverse members and overlying rearwardly the entire bearing construction. A pair of heavy ribs 154 are rigidly connected at their rear ends to the spar and bearing construction and extend forwardly to the leading edge of the wing, the forward portion of each of these ribs being reinforced by a web member as indicated at 156 extending transversely of the front portion of the wing at a position adjacent to the leading edge of the wing. These two heavy ribs 154 are connected by a longitudinally extending spacer member generally indicated at 158 built up of a plurality of structural members riveted, welded, or otherwise suitably secured together and rigidly secured to the webs 156 of the ribs 154. The lower portion of the spacer member 158 is made particularly solid and is provided with an apertured plate 160 which overlies the tapered washer 86, bolts 162 extending through the flange 84 of the bearing bracket 82, the tapered washer 86 and the plate 160 firmly secure the bearing bracket to the specially reinforced internal truss construction of the wing. The portion of the undersurface of the wing between the ribs 54 is cut away to allow the screw member 112 and the brace 96 to fold up into the interior of the wing.

With the above construction all vertical loads of the wing are transmitted through the strut 16 to the spacer member 158 and through this member and the ribs 154 to the spar 142 which is the principal load element carrying the loads between different portions of the wing and the fuselage and between the wings and fuselage and the landing gear. All fore and aft and lateral forces on the wheels are transmitted by the brace member 96 directly to the spar.

In the modified form of the invention illustrated in Figs. 14 and 15, the lower strut member 18 is connected to the upper strut member 20 by a pair of external pivoted links 164 and 166 to restrain the two telescopically associated strut members against rotation relative to each other. The link 164 is hingedly connected at one end to a collar 168 which surrounds the lower member 18 just below the flange 50 to which it is rigidly attached by the cap screws 48. The collar 168 is provided upon one side thereof with an apertured lug and the link 164 is provided with a pair of spaced apart apertured ears 170 which overlie the ends of the lug, a bolt 172 extending through the ears and lug pivotally secures the link to the collar.

The link 166 is similarly pivotally secured to a collar 174 which surrounds the lower end of the upper strut member 20. The collar 174 is rigidly secured to the strut member by a plurality of set screws 176 and is provided with an apertured lug 178, similar to the lug on the collar 168, which lies between apertured ears 180 formed on the link 166. A bolt 182 pivotally secures the link 166 to the collar 174. At their adjoining ends the links 164 and 166 are provided with overlapping apertured lug portions 184 and 186 through which extends a bolt 188 to pivotally secure the two links together. With this construction the strut member 18 is freely slidable in an axial direction with respect to the strut member 20, but is restrained against twisting or rotational movement with respect to the member 20 by the hinged links 164 and 166. The links may be provided in addition to the splines mentioned above, or may be substituted for the splines and the splines entirely omitted. Also the links may be located at any angular position around the strut so long as they do not interfere with the wheel or the retraction of the landing gear and there may be one or a plurality of such linkage devices on each strut as may be desired or required by the conditions of a given construction.

From the above description it will be observed that there has been provided a retractile landing gear in which the wheel moves from a position in a vertical plane transverse to the wing to a position in a horizontal plane parallel to the undersurface of the wing and vice versa, and in which the loads in the landing gear are received by a suitable strong and solid truss construction within the airplane wing and distributed to the various portions of the airplane.

It will also be seen that there has been further provided a landing gear which while light in weight is unusually strong and durable and which is easily operated and not likely to get out of order in use.

While there has been illustrated and described a particular mechanical embodiment of the idea of this invention, it is to be understood that the invention is not limited to the specific construction herein described, but that such changes in the size, shape, and arrangement of parts may be resorted to as come within the scope of the appended claims, what it is desired to secure by Letters Patent is as follows:

What is claimed is:

1. In a retractable landing gear, a vertical load strut, a brace for said strut, means operatively connected with said brace for swinging said strut in a substantially vertical arc about its point of attachment to the landing gear support from its retracted to its extended position and vice versa, and means comprising a skewed bearing between said strut and said support for rotating said strut in one direction as the strut swings from extended to retracted position and rotating the strut in the opposite direction as the strut swings from retracted to extended position.

2. In a retractable landing gear, a vertical load strut, a diagonal brace having an intermediate elbow joint connected at one end to said strut intermediate its length and connected at its other end to the landing gear support, said brace serving to support said strut against loads other than vertical and to guide the strut in a straight substantially vertical arc in its swinging movements to or from its extended position from or to its retracted position, means operatively associated with said brace for swinging said strut about its point of attachment to the landing gear support, and a rotatable skewed bearing between said strut and said support for pivotally connecting said strut to said support and rotating said strut during its swinging movements between its extended and retracted positions.

3. In a retractable landing gear, a vertical load strut, a brace for said strut, means operatively associated with said brace for swinging said strut about its point of attachment to the landing gear support, and means for pivotally connecting said strut to said support and rotating said strut during swinging movements thereof comprising, a rotatable bearing between said strut and said support having its axis of rotation disposed at an oblique angle to the axis of said strut, and a pivotal joint between said strut and said bearing having its axis substantially at right angles to the axis of said strut.

4. In a retractable landing gear, a vertical load strut, a brace for said strut, means associated with said brace for extending and retracting said landing gear, and means for pivotally securing said strut to a landing gear support and rotating said strut during extending and retracting movements of said landing gear, said means comprising, a rotatable bearing including an outer bearing member provided with a socket having its axis disposed at an angle of approximately forty-five degrees downwardly and rearwardly with respect to the axis of said strut, and an inner bearing member rotatable in said socket and attached to the upper end of said strut.

5. In a retractable landing gear supported in an out-board position on the wing of an airplane, a vertical load strut, a brace for said strut, means associated with said brace for extending and retracting said landing gear, and means for pivotally securing said strut to a landing gear support and rotating said strut during extending and retracting movements of said landing gear, said means comprising, a rotatable bearing including an outer bearing member provided with a socket having its axis disposed at an angle of approximately forty-five degrees downwardly, rearwardly, and inwardly with respect to the axis of said strut, an inner bearing member rotatable in said socket, and a pivotal connection between said inner bearing member and the upper end of said strut.

6. In a retractable landing gear, a vertical load strut, a brace for said strut, means associated with said brace for extending and retracting said landing gear, and means for pivotally securing said strut to a landing gear support and rotating said strut during extending and retracting movements of said landing gear, said means comprising, a rotatable bearing including an outer bearing member provided with a socket having its axis disposed at an obtuse angle to the axis of said strut, an inner bearing member rotatable in said socket, and a pivotal pin connection between the upper end of said strut and said inner bearing member, the axis of said pin being substantially at right angles with the axis of said strut.

7. In a retractable landing gear, a vertical load strut, a brace for said strut, means associated with said brace for extending and retracting said landing gear, means for pivotally securing said strut to a landing gear support and rotating said strut during extending and retracting movements of said landing gear, said means comprising, a rotatable bearing including an outer bearing member provided with a socket having its axis disposed at an obtuse angle to the axis of said strut, and an inner bearing member rotatable in said socket and a pivotal connection having its axis substantially at right angles to the axis of said strut between said inner bearing member and the upper end of said strut, and cooperating screw threads on the bearing surface of said socket and said inner bearing member.

8. In a retractable landing gear, a vertical load strut, a brace for said strut, means associated with said brace for extending and retracting said landing gear, and means for pivotally securing said strut to a landing gear support and rotating said strut during extending and retracting movements of said landing gear, said means comprising, a rotatable bearing including an outer member provided with a socket having its axis disposed at an obtuse angle to the axis of said strut and an inner bearing member rotatable in said socket and attached to the upper end of said strut, a rotatable bearing between said brace and said strut and cooperating screw threads between the relatively rotatable elements of said strut bearing and said brace bearing.

9. In an airplane wing having a longitudinal spar comprising an upper member and lower member joined by vertical webs, a retractable landing gear mounting comprising, a pair of bearing brackets disposed between the upper and lower members of said spar in a cut away portion of said webs and spaced apart in a direction along the longitudinal axis of said wing, a reinforcing structure between the upper and lower members of said spar extending around said bearing brackets to the rear thereof, a cantilever truss extending forwardly from said spar to the leading edge of said wing opposite said bearing brackets and a mounting plate on the end of said truss adjacent to the leading edge of said wing.

10. In combination with an airplane wing having a spar comprising an upper member and a lower member joined together by vertical webs, a support for a retractable landing gear comprising, a pair of bearing brackets disposed between said upper and lower members of said spar in a cut away portion of said webs, a reinforcing structure between the upper and lower members of said spar extending around said bearing brackets to the rear thereof, a cantilever truss comprising parallel rib members each including flanges and flange connecting webs extending forwardly from said spar, a spacer between said rib members adjacent to the leading edge of said wing, and a mounting plate on the bottom of said spacer.

KNUT HENRICHSEN.